United States Patent
Shin et al.

(10) Patent No.: US 8,436,963 B2
(45) Date of Patent: May 7, 2013

(54) BACKLIGHT ASSEMBLY AND LIQUID CRYSTAL DISPLAY HAVING THE SAME

(75) Inventors: Taek-Sun Shin, Asan-si (KR);
Byung-Seo Yoon, Incheon (KR);
Heu-Gon Kim, Yongin-si (KR);
Moon-Hwan Chang, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 486 days.

(21) Appl. No.: 12/612,429

(22) Filed: Nov. 4, 2009

(65) Prior Publication Data

US 2010/0110337 A1 May 6, 2010

(30) Foreign Application Priority Data

Nov. 5, 2008 (KR) .......................... 10-2008-0109492

(51) Int. Cl.
*G02F 1/13357* (2006.01)
*F21V 7/04* (2006.01)

(52) U.S. Cl.
USPC ................ 349/64; 349/65; 349/68; 362/97.2; 362/625; 362/235

(58) Field of Classification Search ..................... 349/64, 349/65, 68, 70; 362/97.1, 97.2, 606, 607, 362/613, 623, 625, 626, 97.3, 217.09, 235
See application file for complete search history.

(56) References Cited

U.S. PATENT DOCUMENTS

| 7,510,288 B2 * | 3/2009 | Shin et al. ........................ 362/2 |
| 2001/0046134 A1 | 11/2001 | Masaki et al. |
| 2006/0250707 A1 | 11/2006 | Whitney et al. |
| 2006/0285353 A1 * | 12/2006 | Kim ............................. 362/561 |
| 2007/0035940 A1 | 2/2007 | Yao et al. |
| 2007/0115407 A1 | 5/2007 | Richard et al. |

FOREIGN PATENT DOCUMENTS

| KR | 1020060035044 | 4/2006 |
| KR | 100618089 B1 | 8/2006 |
| KR | 1020060092385 | 8/2006 |
| KR | 1020060092629 | 8/2006 |
| KR | 1020060092629 A | 8/2006 |
| KR | 1020070074158 | 7/2007 |
| KR | 1020070092589 A | 9/2007 |
| KR | 1020070109125 A | 11/2007 |
| KR | 1020080078958 A | 8/2008 |
| WO | 2007105895 A1 | 9/2007 |

* cited by examiner

*Primary Examiner* — Dung Nguyen
*Assistant Examiner* — Tai Duong
(74) *Attorney, Agent, or Firm* — F. Chau & Associates, LLC

(57) ABSTRACT

A backlight assembly including direct-type lamps and an edge-type lamp and a liquid crystal display having the backlight assembly. The direct-type lamps are arranged with a predetermined interval to emit light, and the edge-type lamp is provided at a side portion of a light guide plate provided above or below the direct-type lamps. The light guide plate and a light guide pattern output light, which is emitted from the edge-type lamp, through a space between two adjacent direct-type lamps. The backlight assembly supplies light to the light receiving region such that brightness is uniformly distributed throughout the light receiving region regardless of the position of the direct-type lamps.

18 Claims, 15 Drawing Sheets

BACKLIGHT ASSEMBLY AND LIQUID CRYSTAL DISPLAY HAVING THE SAME

CROSS-REFERENCE TO RELATED APPLICATION

This application relies for priority upon Korean Patent Application No. 2008-109492 filed on Nov. 5, 2008, the contents of which are herein incorporated by reference in their entirety.

BACKGROUND

1. Technical Field

The present invention relates to a backlight assembly and, more particularly, to a backlight assembly capable of supplying light to a light receiving region such that brightness is uniformly distributed throughout the whole light receiving region and a liquid crystal display having the backlight assembly.

2. Discussion of the Related Art

Liquid crystal displays, which are kinds of flat-panel displays, include a liquid crystal panel and a backlight assembly supplying light to the liquid crystal panel. The backlight assembly may be classified into a direct-type backlight assembly and an edge-type backlight assembly according to the position of a lamp and schemes to collect light from the lamp. The direct-type backlight assembly has been employed for a large-size liquid crystal display such as a TV, and the edge-type backlight assembly has been employed for a small-size liquid crystal display such as a mobile device and a note-book computer.

When the liquid crystal display is equipped with the direct-type backlight assembly and the liquid crystal display panel, the direct-type backlight assembly includes a plurality of lamps and a diffusion plate interposed between the lamps and the liquid crystal panel. The diffusion plate diffuses light emitted from the lamps, so that the liquid crystal display panel can uniformly receive light throughout the whole display region.

In order to reduce the volume of the liquid crystal display, reducing the volume of the backlight assembly has been suggested. For example, shortening a distance between the lamps and the diffusion plate has been suggested to reduce the thickness of the liquid crystal display. However, as the distance between the lamps and the diffusion plate is reduced, light emitted from the lamps is not sufficiently diffused by the diffusion plate. Accordingly, the brightness of light supplied to the liquid crystal panel through the diffusion plate varies depending on regions.

SUMMARY

Exemplary embodiments of the present invention provide a backlight assembly capable of supplying light to a light receiving region such that brightness is uniformly distributed throughout the whole light receiving region, and a liquid crystal display including the backlight assembly.

In an exemplary embodiment of the present invention, a backlight assembly includes at least one first light source, a light guide plate, at least one second light source, and a light guide pattern. The first light source emits light. The light guide plate is provided above the first light source and has a first region corresponding to a position of the first light source and a second region corresponding to a space between two adjacent first light sources. The second light source is provided at a side portion of the light guide plate to supply the light to the light guide plate. The light guide pattern is positioned on the light guide plate at the second region to output the light emitted from the second light source to an exterior of the light guide plate.

In an exemplary embodiment of the present invention, a liquid crystal display includes a liquid crystal panel and a backlight assembly. The liquid crystal panel receives light to display an image. The backlight assembly supplies the light to the liquid crystal panel. The backlight assembly includes at least one first light source, a light guide plate, at least one second light source, and a light guide pattern. The first light source emits a portion of the light. The light guide plate is provided above the first light source and has a first region corresponding to a position of the first light source and a second region corresponding to a space between two adjacent first light sources. The second light source is provided at a side portion of the light guide plate to supply light to the light guide plate. The light guide pattern is positioned on the light guide plate at the second region to output the light emitted from the second light source to an exterior of the light guide plate.

According to the embodiments of the present invention, the backlight assembly can output the light between two adjacent direct-type lamps by using the light guide plate, the edge-type lamp, and the light guide pattern. Accordingly, the backlight assembly can supply the light to the light receiving region such that brightness is uniformly distributed throughout the whole light receiving region regardless of the position of the direct-type lamps.

In addition, when the backlight assembly includes the diffusion plate diffusing the light emitted from the direct-type lamps, the volume of the backlight assembly may be reduced by shortening the distance between the direct-type lamps and the diffusion plate since an amount of the light of the edge-type lamp guided by the light guide pattern is increased.

BRIEF DESCRIPTION OF THE DRAWINGS

Exemplary embodiments of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present.

Figure 1:
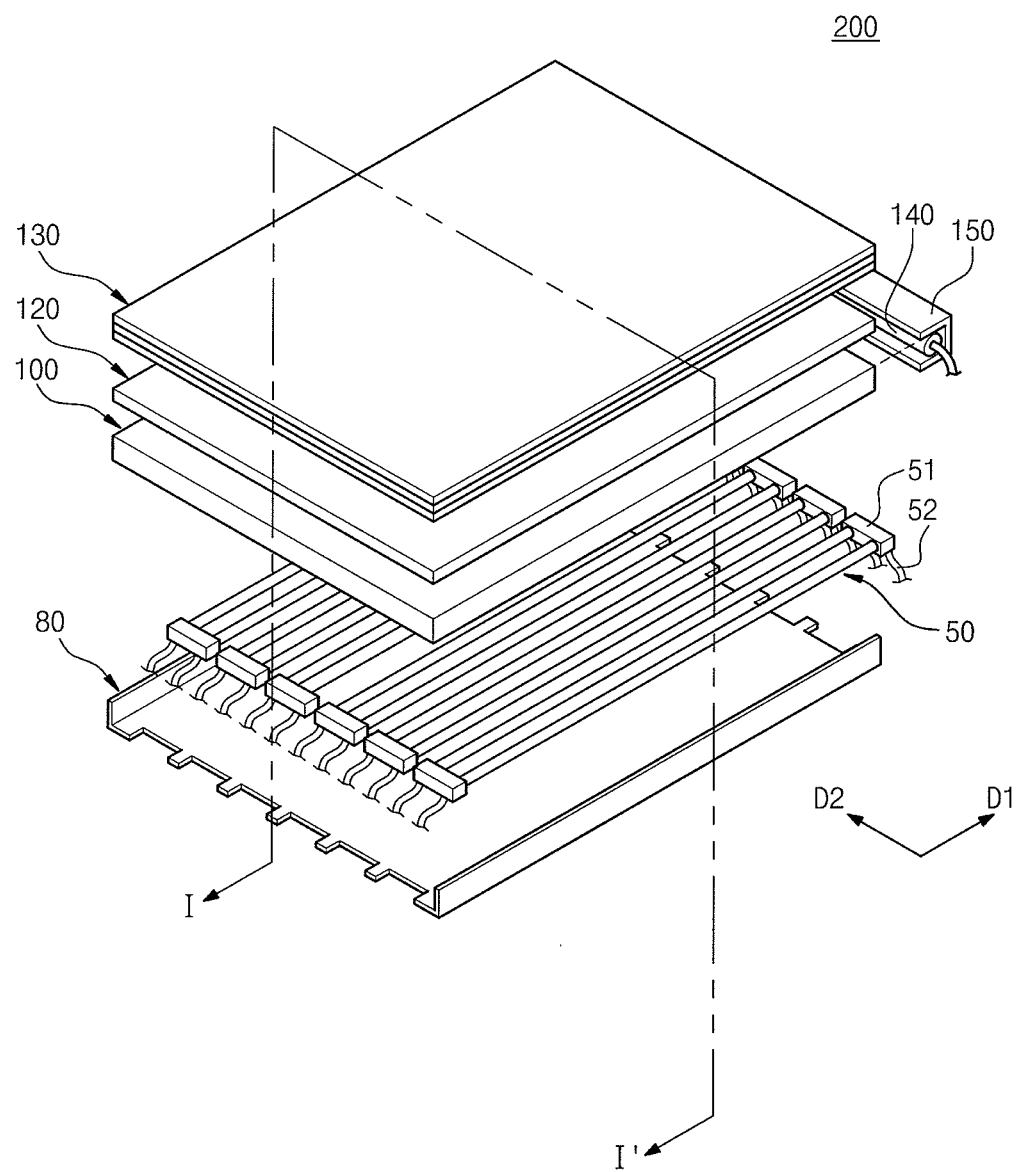
FIG. 1 is an exploded perspective view showing a backlight assembly according to a an embodiment of the present invention.

FIG. 1 is an exploded perspective view showing a backlight assembly according to an embodiment of the present invention.

Referring to FIG. 1, a backlight assembly 200 includes a plurality of direct-type lamps 50, a reflective plate 80, a light guide plate 100, an edge-type lamp 140, a lamp cover 150, a diffusion plate 120, and a plurality of optical sheets 130.

The direct-type lamps 50 are formed as line light sources extending in a first direction D1, and are arranged at predetermined intervals therebetween on the reflective plate 80 in a second direction D2 substantially perpendicular to the first direction D1. The direct-type lamps 50 are cold cathode fluorescent lamps (CCFLs), and include lamp electrode lines 52, respectively. The direct-type lamps 50 are coupled with a plurality of lamp holders 51. The lamp electrode lines 52 are electrically connected to an inverter (not shown), so that the direct-type lamps 50 can receive power from the inverter.

The reflective plate 80 is provided below the direct-type lamps 50 to reflect light emitted from the direct-type lamps 50. Accordingly, the backlight assembly 200 can supply a greater amount of light in an upward direction from the direct-type lamps 50 due to the reflective plate 80.

The light guide plate 100 is provided above the direct-type lamps 50, and the edge-type lamp 140 is provided at one side of the light guide plate 100. The edge-type lamp 140 may include a CCFL, and is formed as a line light source extending in the second direction D2. The lamp cover 150 is coupled with the edge-type lamp 140 to cover edge-type lamp 140.

Although the edge-type lamp 140 is the CCFL, in an alternative embodiment, the edge-type lamp 140 may include light emitting diodes. When the edge-type lamp 140 includes light emitting diodes, the edge-type lamp 140 may include a plurality of light emitting diodes as point light sources.

Figure 2:
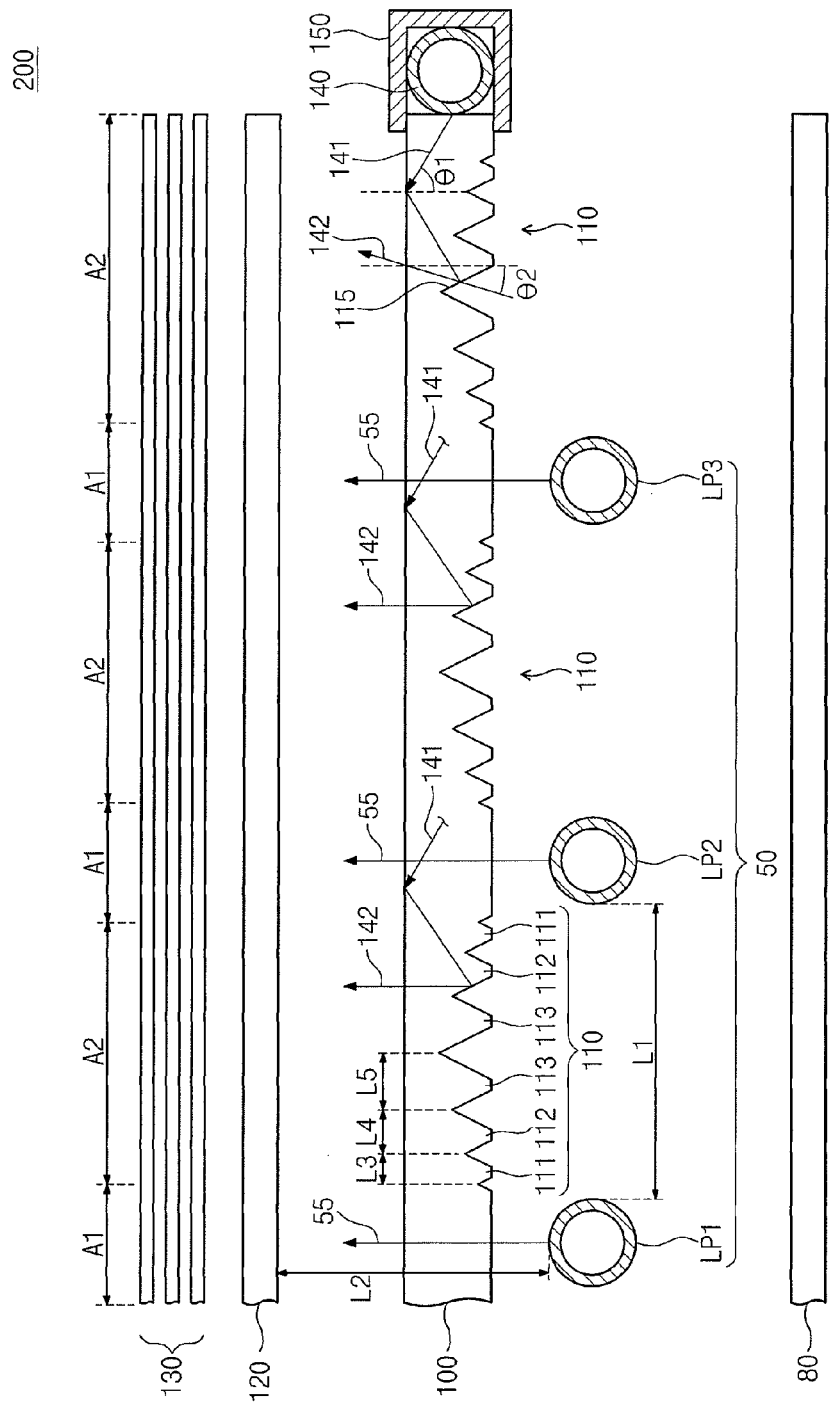
FIG. 2 is a sectional view taken along line I-I' of FIG. 1.

The light guide plate 100 has a light guide pattern 110 (see FIG. 2). Light emitted from the edge-type lamp 140 is supplied to the light guide plate 100, and the light supplied to the light guide plate 100 is transmitted in an upward direction through the light guide plate 100 due to the light guide pattern 110. The light guide pattern 110 is formed on the light guide plate 100 at a position corresponding to the space between two adjacent direct-type lamps 50.

The diffusion plate 120 is provided above the light guide plate 100 to diffuse light. The light supplied to the diffusion plate 120 includes light emitted from the edge-type lamp 140, as well as light emitted from the direct-type lamps 50. Accordingly, the backlight assembly 200 can supply light with uniform brightness in an upward direction through the diffusion plate 120.

The optical sheets 130 are provided above the diffusion plate 120. The optical sheets 130 may be flexible. The optical sheets 130 may include prism sheets, which collect light that has passed through the diffusion plate 120 to improve front brightness, and diffusion sheets that diffuse light output from the diffusion plate 120.

FIG. 2 is a sectional view taken along line I-I' of FIG. 1.

Referring to FIG. 2, the direct-type lamps 50 include a first direct-type lamp LP1, a second direct-type lamp LP2, and a third direct-type lamp LP3. Two adjacent direct-type lamps 50 are spaced apart from each other by a first length L1, and each direct-type lamp 50 is spaced apart from the diffusion plate 120 by a second length L2.

The light guide plate 100 is interposed between the diffusion plate 120 and the direct-type lamps 50. The light guide plate 100 includes first regions A1 and second regions A2. The first regions A1 are placed corresponding to the first to third direct-type lamps LP1, LP2, and LP3, and the second regions A2 are placed in a space between two adjacent direct-type lamps 50. In addition, the edge-type lamp 140 is provided at one side of the light guide plate 100, and light emitted from the edge-type lamp 140 is supplied to the light guide plate 100.

The light guide plate 100 includes resin such as polymethylmethacrylate (PMMA), polycarbonate (PC), or polystyrene (PS). The resin has a refractive index of about 1.4 to about 1.6, which is greater than that of air.

When light is transmitted from a first material to a second material having a refractive index smaller than that of the first material, that is, when an incident angle of the light is greater than a critical angle thereof, the light is totally reflected from an interfacial surface between the first and second materials. This is referred to as total reflection of light. Accordingly, since the light guide plate 100 includes a material having a refractive index greater than that of air and the light guide plate 100 is surrounded by an air layer, light transmitted from the edge-type lamp 140 to the light guide plate 100 is totally reflected in the light guide plate 100 due to an incident angle of the light.

The light guide plate 100 includes the light guide pattern 110. The light guide pattern 110 is provided in each second region A2. According to an embodiment of the present invention, the light guide pattern 110 has a plurality of convex parts. The convex parts include first, second and third convex parts 111, 112 and 113. The first to third convex parts 111 to 113 reflect light by using a reflective surface 115 thereof, which is inclined relative to a surface of the light guide plate 100.

With respect to the light supplied to the light guide plate 100 from the edge-type lamp 140, light having a first incident angle θ1, which is greater than the critical angle so that the light is totally reflected in the light guide plate 100, is referred to as first light 141. The first to third convex parts 111 to 113 reflect the first light 141 from the reflective surface 115. Accordingly, the first light 141 is changed into second light 142 having a second incident angle θ2 smaller than the critical angle to be output to an exterior through the light guide plate 100.

In other words, the light supplied to the light guide plate 100 from the edge-type lamp 140 is output to an exterior through the light guide pattern 110. Accordingly, the light emitted from the edge-type lamp 140 is output from the light guide plate 100 at a position corresponding to the light guide pattern 110.

When a backlight assembly employs direct-type lamps as a light source, brightness of the backlight assembly between the two adjacent direct-type lamps may be lower than brightness of the backlight assembly at the position of each direct-type lamp. However, according to the an embodiment of the present invention, since the backlight assembly 200 also includes the light guide plate 100 and the edge-type lamp 140 outputting light through the second region A2 as well as the direct-type lamps 50, the brightness of the backlight assembly 100 between two adjacent direct-type lamps 50 can be improved to correspond to the brightness of the backlight assembly 100 at the position of each direct-type lamp 50. Further details of this feature will be described with reference to graphs of FIGS. 3A, 3B, and 3C.

The sizes of the convex parts defining the light guide pattern 110 are gradually reduced toward the boundary of the second region A2 from the center of the second region A2. In more detail, the third convex parts 113 are positioned in the central portion of the second region A2, and the first convex parts 111 are positioned at the boundary portion of the second region A2. Each second convex part 112 is positioned between one of the first convex parts 111 and one of the third convex parts 113. Each first convex part 111 has a width L3, each second convex part 112 has a width L4, and each third convex part 113 has a width L5, where L4 is greater than L3, and L5 is greater than L4.

As the size of the convex parts defining the light guide pattern 110 is increased, the area of the reflective surface 115 reflecting the first light 141 is increased. Accordingly, an amount of the first light 141 reflected by the convex parts is increased as the size of the convex parts increases. Therefore, when amounts of the first light 114 reflected by the first convex parts 111, the second convex parts 112, and the third convex parts 113, respectively, are referred to as a first light amount, a second light amount, and a third light amount, the third light amount has the greatest value, and the first light amount has the smallest value. In other words, an amount of light output from the second convex parts 112 is greater than an amount of light output from the first convex parts 111, and an amount of light output from the third convex parts 113 is greater than an amount of the light output from the second convex parts 112.

As described above, even though light is output from the light guide plate 100 through the whole second region A2, an amount of light output from the light guide plate 100 through a central portion of the second region A2 is greater than an amount of light output from the light guide plate 100 through a boundary portion of the second region A2. This is because the brightness of the backlight assembly 200 at the position of each direct-type lamp 50 is lower than that of the backlight assembly 200 between the two adjacent direct-type lamps 50 when the backlight assembly 200 employs the direct-type lamps 50 as a light source.

According to an embodiment of the present invention, the backlight assembly 200 includes the diffusion sheet 120 and the optical sheets 130 that are sequentially arranged above the light guide plate 100. The diffusion sheet 120 and the optical sheets 130 diffuse light emitted from the direct-type lamps 50 to supply the light to the whole light receiving region with uniform brightness. According to the an embodiment of the present invention, since the backlight assembly 200 includes the edge-type lamp 140 and the light guide plate 100 used to improve light brightness between the direct-type lamps 50, the backlight assembly 200 can supply light to the light receiving region with uniform brightness even if the backlight assembly 200 does not include the diffusion plate 120 or the optical sheets 130. Accordingly, at least one of the diffusion plate 120 and the optical sheets 130 may be omitted in the backlight assembly 200.

Figure 3A:
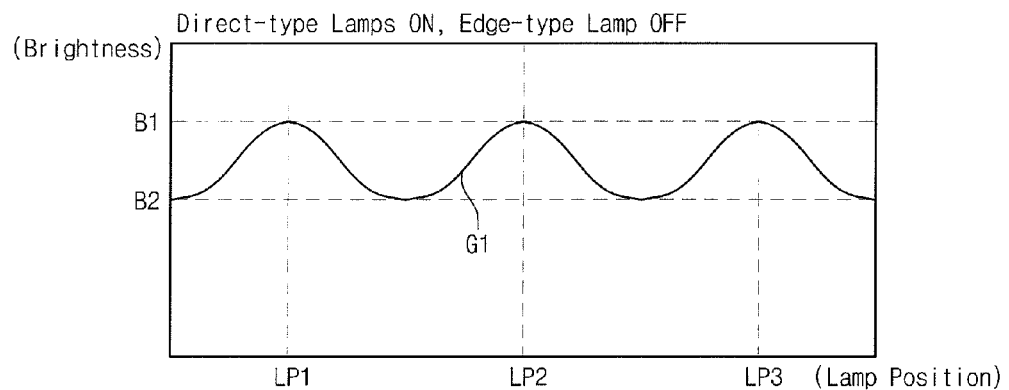
FIGS. 3A to 3C are graphs showing light brightness as a function of the position of lamps according to the operational state of the lamps of the backlight assembly shown in FIG. 2.
Figure 3B:
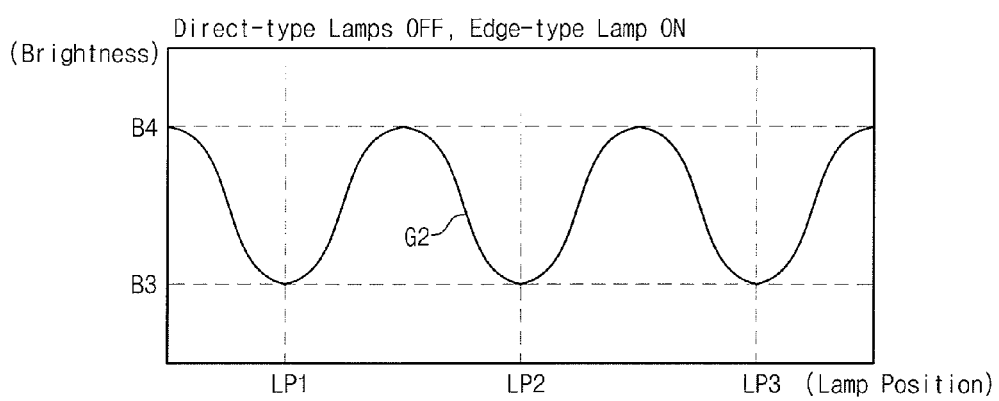
Figure 3C:
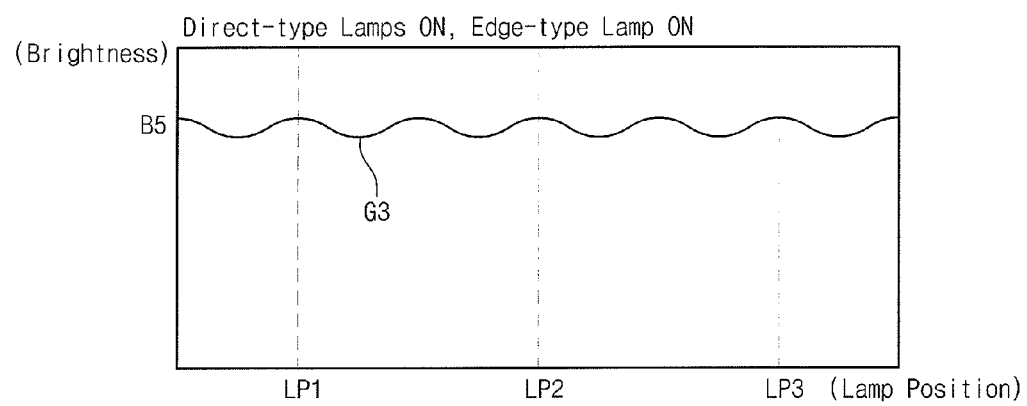

FIGS. 3A to 3C are graphs showing the brightness of the backlight assembly 200 as a function of positions of the above lamps according to the operational state of the lamps of the backlight assembly 200 shown in FIG. 2. FIG. 3A shows the brightness of the backlight assembly 200 as a function of the positions of the lamps LP1, LP2 and LP3, when the direct-type lamps 50 are on, and the edge-type lamp 140 is off. FIG. 3B shows the brightness of the backlight assembly 200 as a function of the positions of the lamps LP1, LP2 and LP3 when the direct-type lamps 50 are off, and the edge-type lamp 140 is on. FIG. 3C shows the brightness of the backlight assembly 200 as a function of the positions of the lamps LP1, LP2 and LP3 when all of the direct-type lamps 50 and the edge-type lamp 140 are on.

Referring to a first curve (G1) of FIG. 3A, when the direct-type lamps 50 are on and the edge-type lamp 140 is off, the backlight assembly 200 has first brightness B1 corresponding to each position of the first to third direct-type lamps LP1 to LP3, and has second brightness B2 lower than the first brightness B1 between the two adjacent direct-type lamps 50.

Referring to a second curve (G2) of FIG. 3B, when the direct-type lamps 50 are off and the edge-type lamp 140 is on, the backlight assembly 200 has third brightness B3 corresponding to each position of the first to third direct-type lamps LP1 to LP3, and has fourth brightness B4 higher than the third brightness B3 between the two adjacent direct-type lamps 50.

Referring to a third curve (G3) of FIG. 3C, when all of the direct-type lamps 50 and the edge-type lamp 140 are on, the backlight assembly 200 outputs light having fifth brightness B5 throughout the whole light receiving region regardless of the position of the first to third direct-type lamps 50. In other words, if all of the direct-type lamps 50 and the edge-type lamp 140 are operating, the brightness shown in FIG. 3A and the brightness shown in FIG. 3B are combined with each other. Accordingly, the backlight assembly can output light having uniform brightness throughout the light emitting region without degrading brightness in a specific region.

Figure 4:
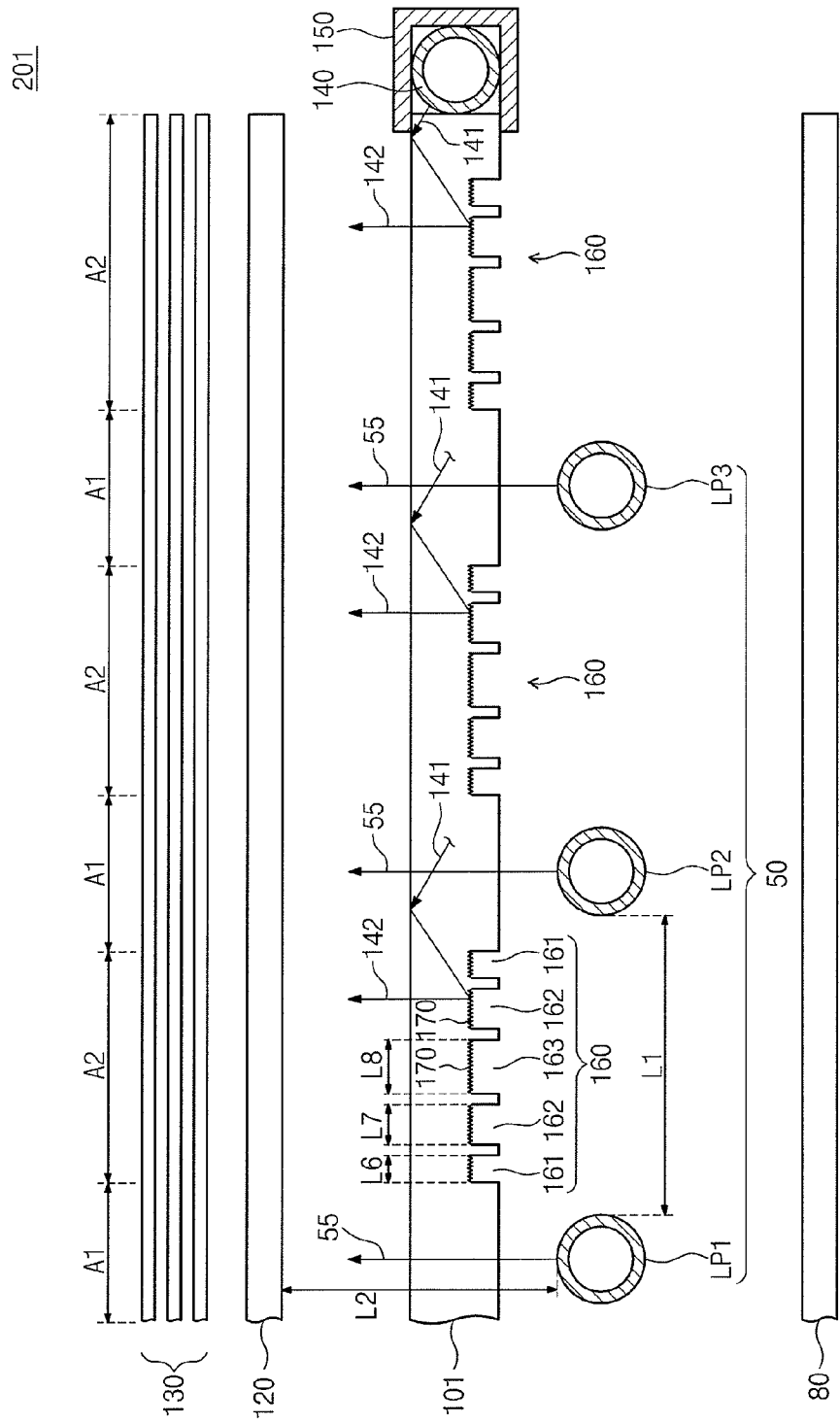
FIG. 4 is a sectional view showing a backlight assembly according to an embodiment of the present invention.

FIG. 4 is a sectional view showing a backlight assembly according to an embodiment of the present invention. Referring to FIG. 4, a backlight assembly 201 includes a light guide plate 101 having a light guide pattern 160. The light guide pattern 160 includes first concave parts 161, second concave parts 162 having the size greater than that of the first concave parts 161, and third concave parts 163 having the size greater than that of the second concave parts 162. In more detail, the first concave parts 161 have a width L6, and the second concave parts 162 have a width L7 greater than L6. The third concave parts 163 have a width L8 greater than L7.

The first to third concave parts 161, 162, and 163 are positioned at the second region A2. In detail, the third concave parts 163 are positioned at the central portion of the second region A2, and the first concave parts 161 are positioned at the boundary portion of the second region A2. Each second concave part 162 is interposed between one of the first concave parts 161 and one of the third concave parts 163.

In addition, each of the first to third concave parts 161, 162, and 163 has a reflective surface 170. The reflective surface 170 is formed at bottom surfaces of the first to third concave parts 161, 162, and 163, and the reflective surface 170 has a concave-convex shape. The first to third concave parts 161, 162, and 163 reflect the first light 141 to an exterior similarly to the first to third convex parts 111, 112, and 113 of the light guide plate 100.

As the size of the reflective surface 170 of the first to third concave parts 161, 162, and 163 is increased, an amount of the first light 141 reflected from the reflective surface 170 is increased. Accordingly, assuming that amounts of the first light 141 reflected from the first concave parts 161, the second concave parts 162, or the third concave parts 163 are referred to as a first light amount, a second light amount, or a third light amount, respectively, the third amount is the greatest value, and the first amount is the smallest value. An amount of light output from the second concave parts 162 is greater than an amount of light output from the first concave parts 161, and an amount of light output from the third concave parts 163 is greater than an amount of the light output from the second concave parts 162.

The backlight assembly 201 includes the diffusion plate 120 and the optical sheets 130, which are sequentially arranged above the light guide plate 101. According to an embodiment of the present invention, since the backlight assembly 201 includes the edge-type lamp 140 and the light guide plate 101 used to improve light brightness between the direct-type lamps 50, even if the backlight assembly 201 does not include the diffusion plate 120 or the optical sheets 130, light having uniform brightness can be supplied to the whole light receiving region. Accordingly, at least one of the diffusion plate 120 and the optical sheets 130 can be omitted in the backlight assembly 201.

Figure 5:
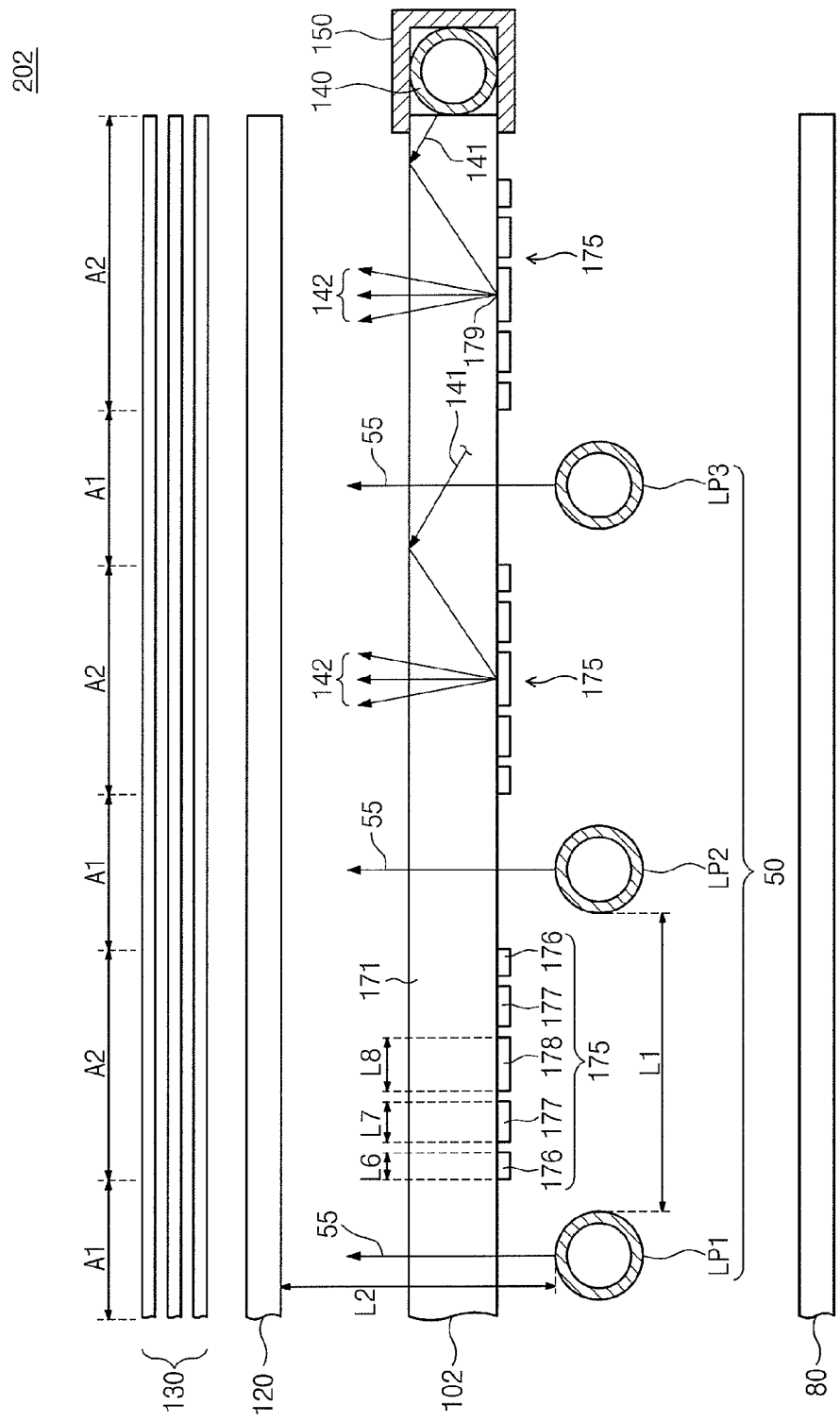
FIG. 5 is a sectional view showing a backlight assembly according to an embodiment of the present invention.

FIG. 5 is a sectional view showing a backlight assembly according to an embodiment of the present invention. Referring to FIG. 5, a backlight assembly 202 includes a light guide plate 102 having a light guide pattern 175, and the light guide pattern 175 includes a plurality of printed patterns. In more detail, the light guide plate 102 includes a base part 171 having a plate shape and first, second and third printed patterns 176, 177 and 178 provided on the base part 171.

The first to third printed patterns 176 to 178 include a material (e.g., titanium dioxide (TiO$_2$)) reflecting light. Accordingly, the first to third printed patterns 176 to 178 change the path of light, which is emitted from the edge-type lamp 140 and then totally reflected in the light guide plate 102, similar to the first to third convex parts 111, 112, and 113 and the first to third concave parts 161, 162, and 163. Assuming that light totally reflected in the light guide plate 102 is referred to as the first light 141, and light, which is output to an exterior with the optical path changed by the first to third printed patterns 176, 177, and 178, is referred to as the second light 142, the first to third printed patterns 176, 177, and 178 change the first light 141 into the second light 142.

The first printed patterns 176 have a width L6, and the second printed patterns 177 have a width L7 greater than L6. The third printed patterns 178 have a width L8 greater than L7. The third printed patterns 178 are positioned at the central portion of the second region A2, and the first printed patterns 176 are positioned at the boundary portion of the second region A2. Each second printed pattern 177 is positioned between one of the first printed patterns 176 and one of the third printed patterns 178.

As the size of a reflective surface 179 of the first to third printed patterns 176, 177, and 178 is increased, an amount of the first light 141 reflected from the reflective surface 179 is increased. Accordingly, assuming that amounts of light reflected from the first printed patterns 176, the second printed patterns 177, or the third printed patterns 178 are referred to as the first light amount, the second light amount, and the third light amount, respectively, the third light amount is the greatest value, and the first light amount is the smallest value. This means that an amount of light output from the second printed patterns 177 is greater than an amount of light output from the first printed patterns 176, and an amount of light output from the third printed patterns 178 is greater than an amount of the light output from the second printed patterns 177 even though light is output from the whole second region A2 of the light guide plate 102.

Figure 6:
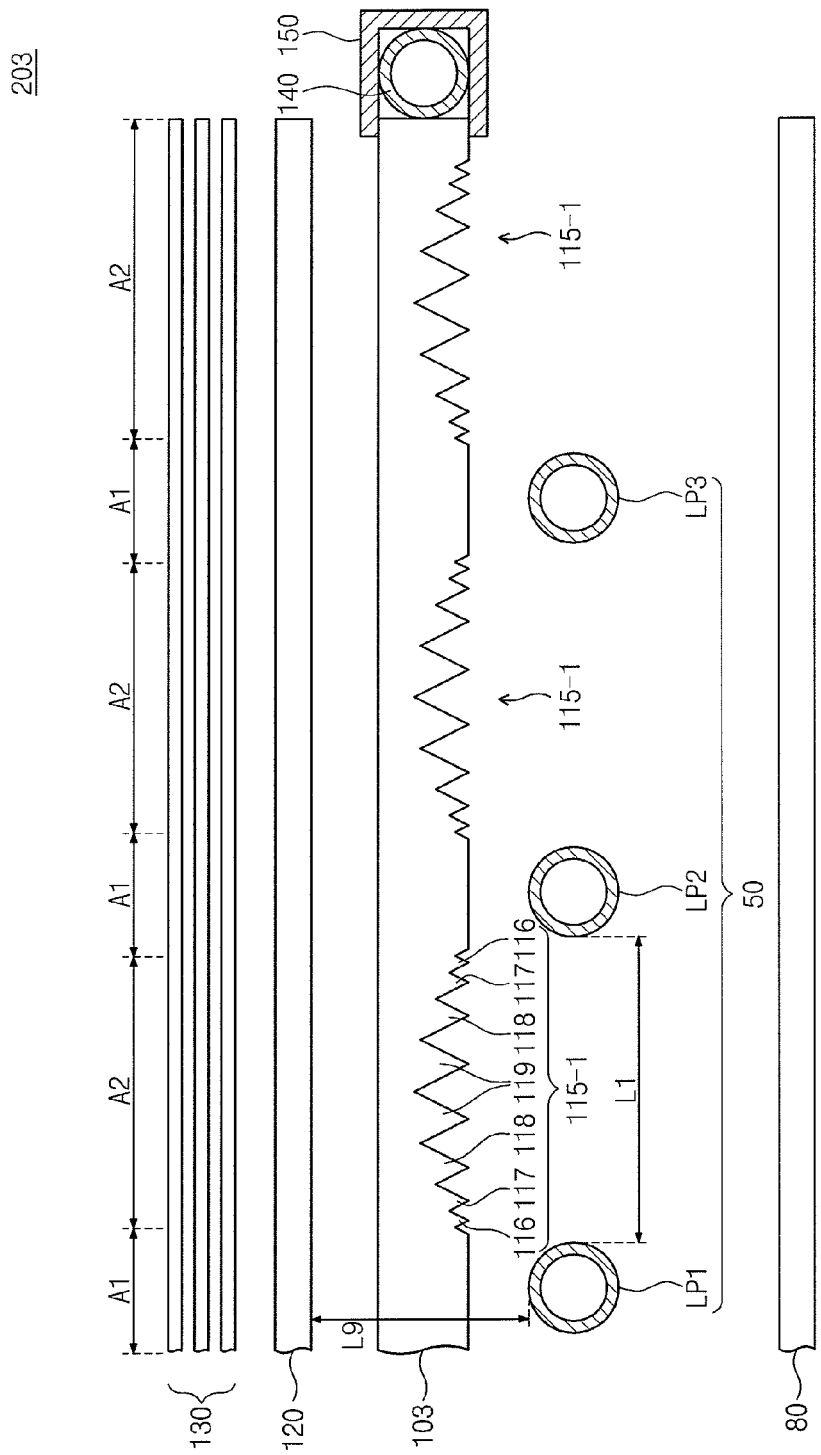
FIG. 6 is a sectional view showing a backlight assembly according to an embodiment of the present invention.

FIG. 6 is a sectional view showing a backlight assembly according to an embodiment of the present invention.

Referring to FIG. 6, a backlight assembly 203 includes the light guide plate 103, the direct-type lamps 50, the edge-type lamp 140, the diffusion plate 120, and the optical sheets 130.

The light guide plate 103 includes a light guide pattern 115-1 formed in the second region A2.

The light guide pattern 115-1 includes first to fourth convex parts 116, 117, 118, and 119 having different sizes. In more detail, the size of the second convex parts 117 is greater than the size of the first convex parts 116, and the size of the third convex parts 118 is greater than the size of the second convex parts 117. In addition, the size of the fourth convex parts 119 is greater than the size of the third convex parts 118.

The direct-type lamps 50 include the first to third direct-type lamps LP1, LP2, and LP3. The distance between the first direct-type lamp LP1 and the second direct-type lamp LP2 is the first length L1, and the distance between each direct-type lamp 50 and the diffusion plate 120 is a ninth length L9.

The ninth length L9 is shorter than the second length L2 (see FIG. 2). In other words, the distance between the light guide plate 103 and the diffusion plate 120 provided in the backlight assembly 203 is shorter than the distance between the light guide plate 100 and the diffusion plate 120 (see FIG. 2) provided in the backlight assembly 200 (see FIG. 2). In addition, the light guide pattern 110 (see FIG. 2) in the backlight assembly 200 (see FIG. 2) includes the first to third convex parts 111, 112, and 113, and the light guide pattern 115-1 in the backlight assembly 203 includes the first to fourth convex parts 116, 117, 118, and 119. In other words, the light guide pattern 115-1 in the backlight assembly 203 has more convex parts per unit area than the light guide pattern 100 in the backlight assembly 200 (see FIG. 2).

As described above with reference to FIG. 2, as the number of convex parts of the light guide pattern 115-1 is increased, an amount of light emitted from the edge-type lamp 140 and reflected from the light guide pattern 115 is increased. Accordingly, the backlight assembly 203 can output a greater amount of light to an exterior in the second region A2, as compared with the backlight assembly 200.

In a backlight assembly including direct-type lamps and a diffusion plate, as the distance between each direct-type lamp and the diffusion plate is shortened, the whole volume of the backlight assembly can be reduced. However, as the distance between each direct-type lamp and the diffusion plate is shortened, less light emitted from the direct-type lamps is diffused by the diffusion plate. Accordingly, the brightness of the backlight assembly may be reduced between two adjacent direct-type lamps. However, according to an embodiment of the present invention, the number of convex parts of the light guide pattern 115-1 is increased, thereby increasing an amount of light between two adjacent direct-type lamps. Accordingly, the backlight assembly 203 can supply light to the whole light receiving region with uniform brightness. In other words, if the number of the convex parts of the light guide pattern 115-1 is increased, the distance between the diffusion plate 120 and each direct-type lamp 50 may be reduced. As a result, the whole volume of the backlight assembly 203 can be reduced.

Figure 7:
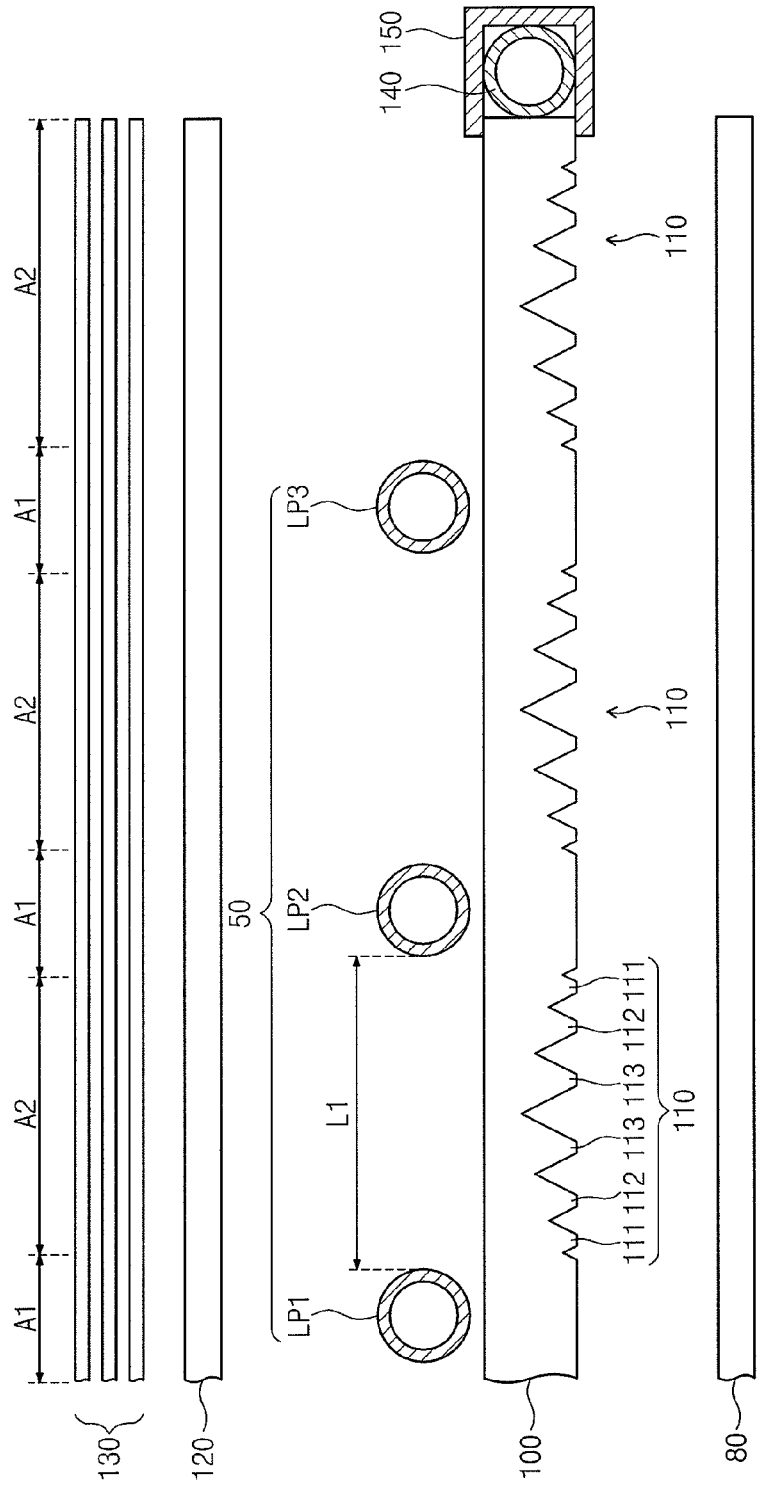
FIG. 7 is a sectional view showing a backlight assembly according to an embodiment of the present invention.

FIG. 7 is a sectional view showing a backlight assembly 204 according to a an embodiment of the present invention.

The backlight assembly 204 includes the reflective plate 80, the light guide plate 100 provided above the reflective plate 80, the edge-type lamp 140 provided at a side portion of the light guide plate 100, the lamp cover 150 coupled with the edge-type lamp 140, the direct-type lamps 50 provided above the light guide plate 100, the diffusion plate 120 provided above the direct-type lamps 50, and the optical sheets 130 provided above the diffusion plate 120. Unlike the embodiment described in connection with FIG. 2, the light guide plate 100 is interposed between the reflective plate 80 and the direct-type lamps 50.

Accordingly, after light that has been supplied to the light guide plate 100 from the edge-type lamp 140 is output through the second region A2 by the light guide pattern 110 of the light guide plate 100, the light sequentially passes through the diffusion plate 120 and the optical sheets 130 and then is output to an exterior.

Figure 8:
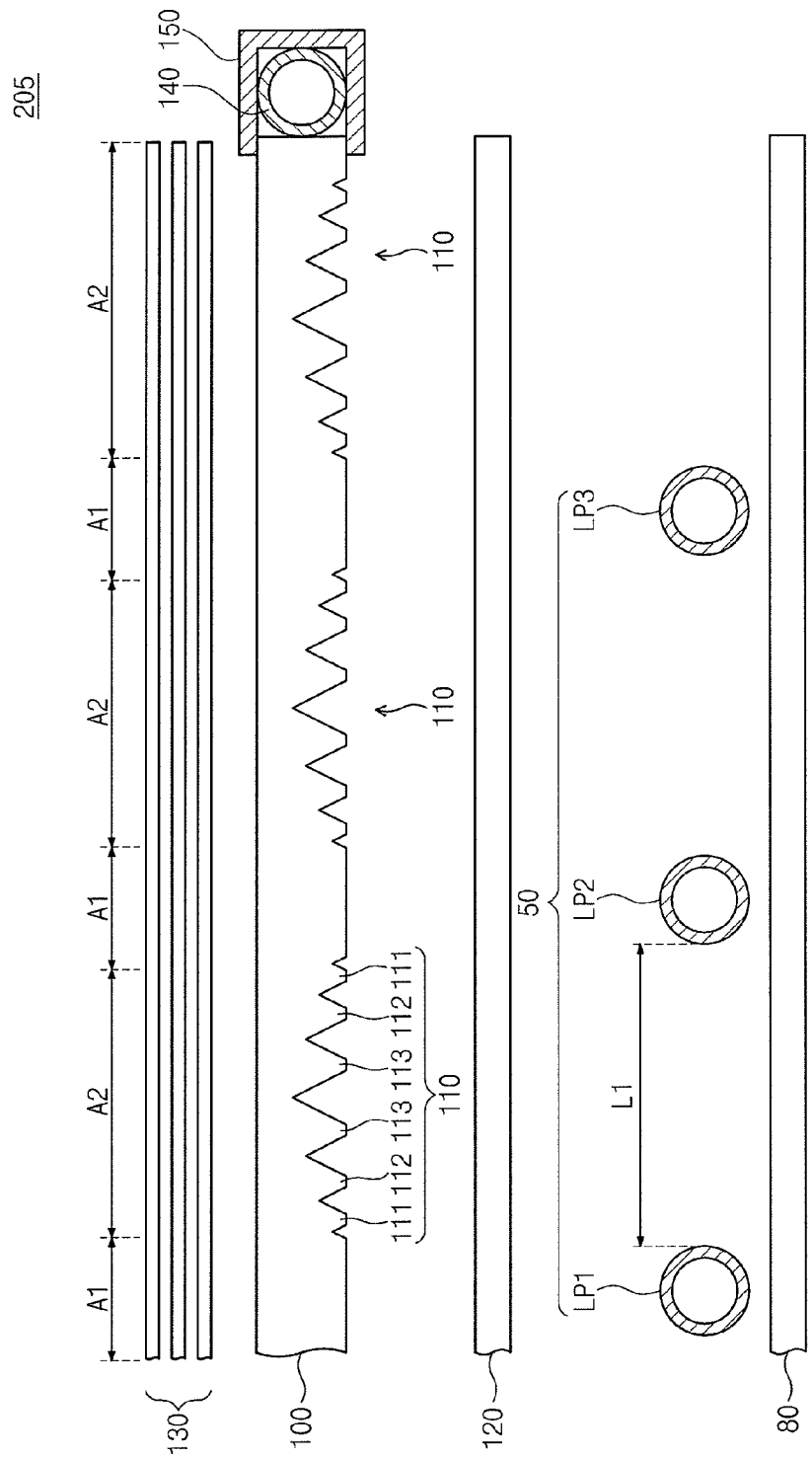
FIG. 8 is a sectional view showing a backlight assembly according to an embodiment of the present invention.

FIG. 8 is a sectional view showing a backlight assembly 205 according to an embodiment of the present invention. Referring to FIG. 8, the backlight assembly 205 includes the reflective plate 80, the direct-type lamps 50 provided above the reflective plate 80, the diffusion plate 120 provided above the direct-type lamps 50, the light guide plate 100 provided above the diffusion plate 120, the edge-type lamp 140 provided at a side portion of the light guide plate 100, the lamp cover 150 coupled with the edge-type lamp 140, and the optical sheets 130 provided above the light guide plate 100. In other words, unlike the embodiment described in connection with FIG. 2, the light guide plate 100 is interposed between the diffusion plate 120 and the optical sheets 130.

Accordingly, after light that has been supplied to the light guide plate 100 from the edge-type lamp 140 is output through the second region A2 by the light guide pattern 110, the light is output to an exterior through the optical sheets 130.

Figure 9:
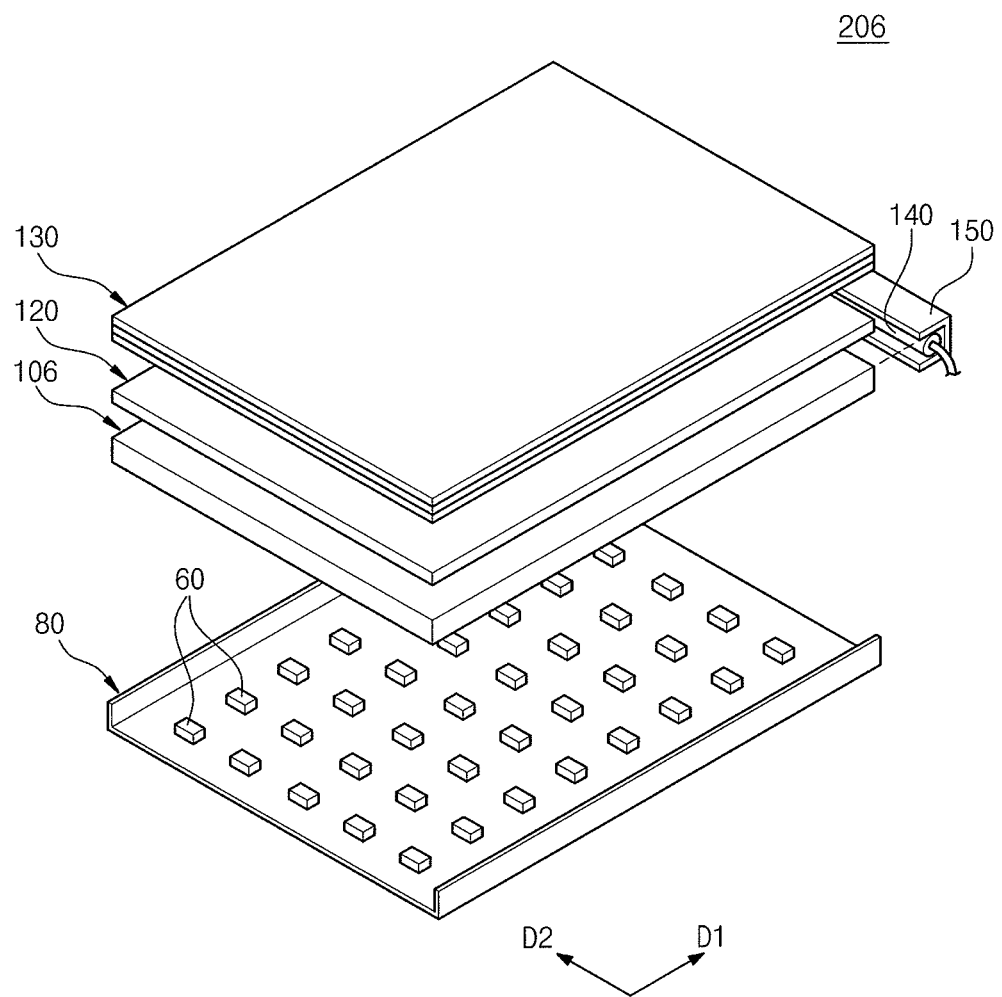
FIG. 9 is an exploded perspective view showing a backlight assembly according to an embodiment of the present invention.

FIG. 9 is an exploded perspective view showing a backlight assembly 206 according to an embodiment of the present invention. Referring to FIG. 9, the backlight assembly 206 includes direct-type lamps 60 having the form of point light sources. The direct-type lamps 60 may include light emitting diodes (LEDs). The direct-type lamps 60 are arranged on the reflective plate 80 with the same interval in the first and second directions D1 and D2.

Similar to the embodiment described in connection with FIGS. 1 and 2, the edge-type lamp 140 includes a cold cathode fluorescent lamp (CCFL) having the form of a line light source. Alternatively, the edge-type lamp 140 may include a light emitting diode. When the edge-type lamp 140 includes the light emitting diode, the edge-type lamp 140 may include a plurality of light emitting diodes having the form of point light sources.

Figure 10:
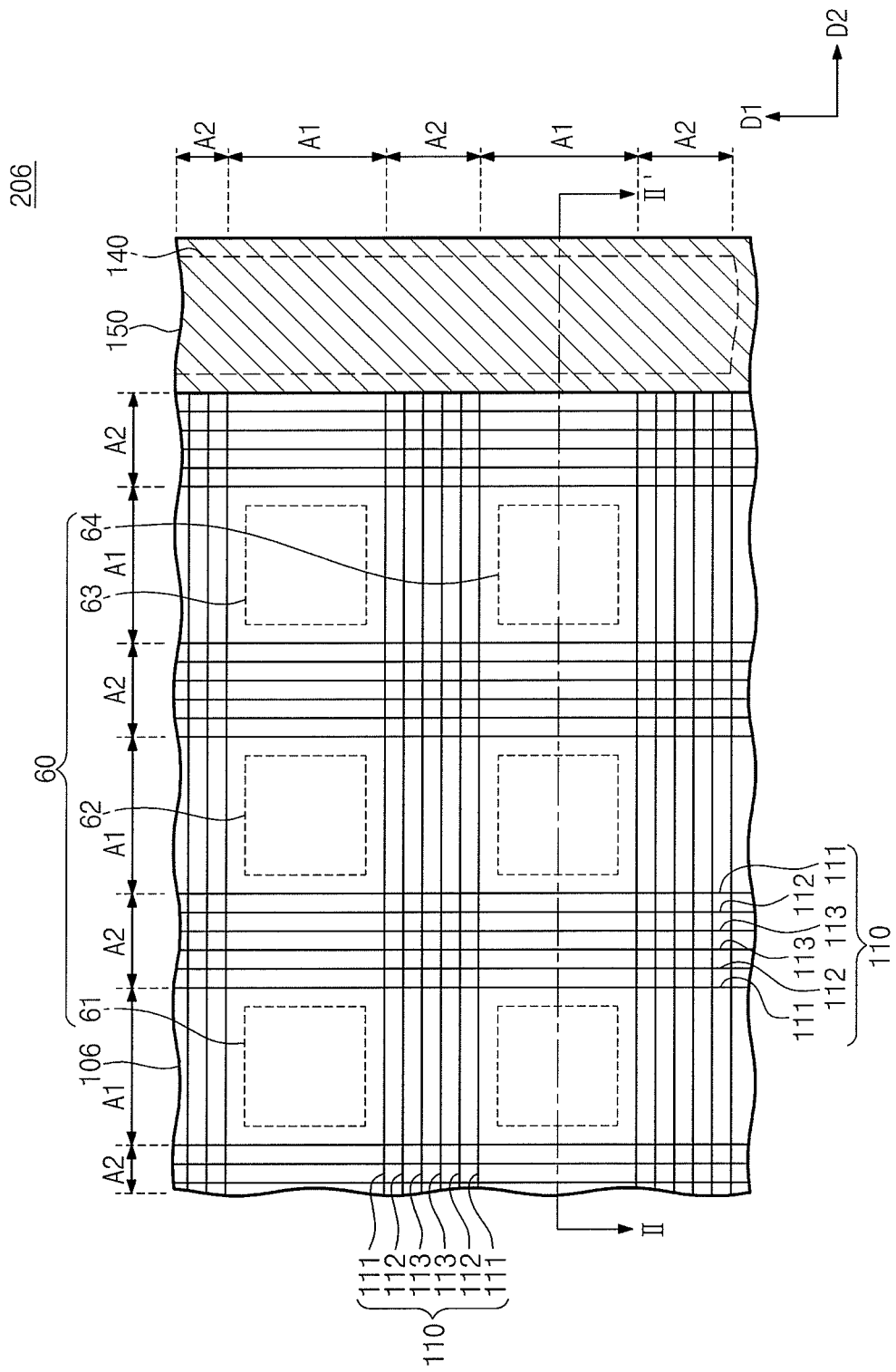
FIG. 10 is a plan view showing the backlight assembly shown in FIG. 9.
Figure 11:
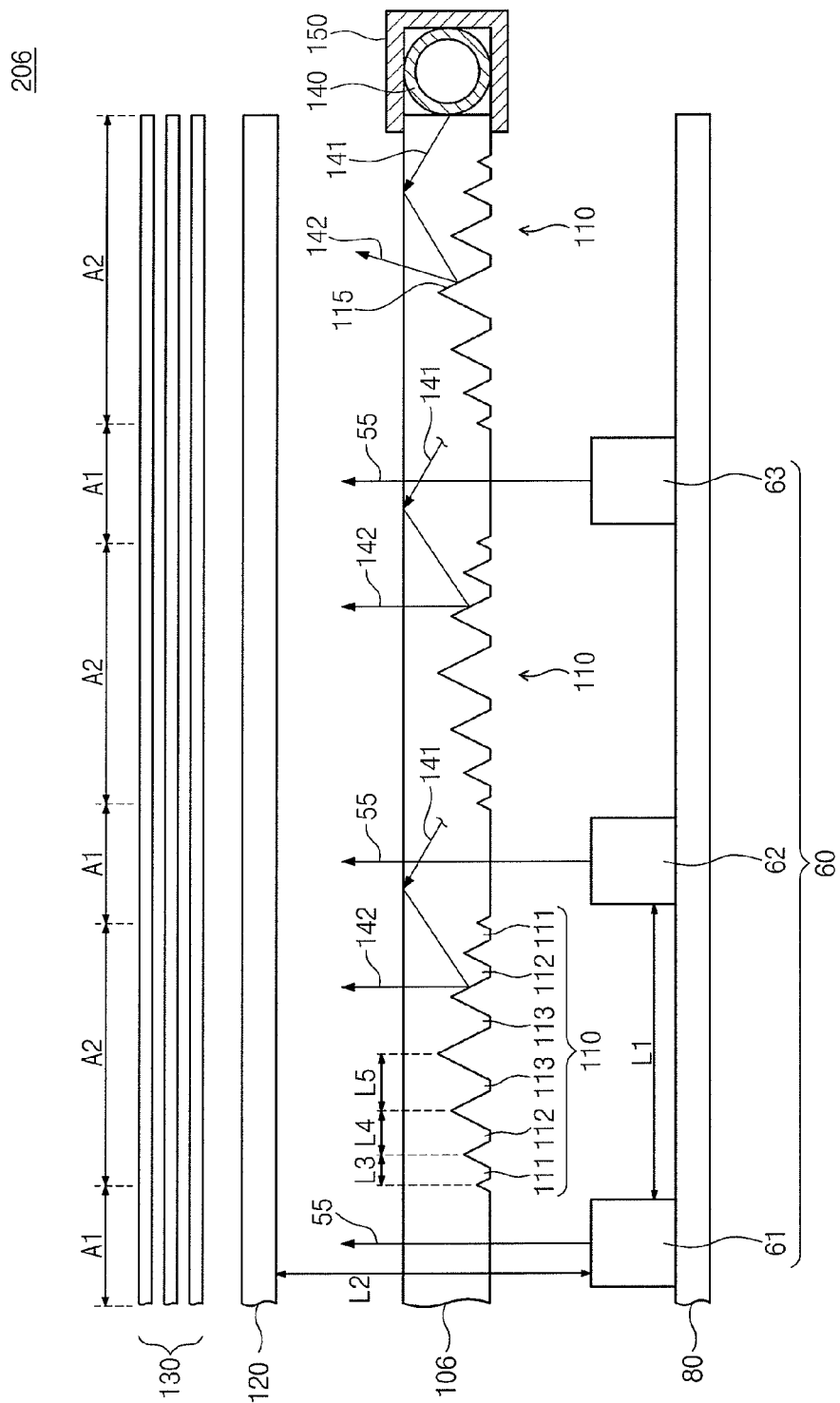
FIG. 11 is a sectional view taken along line II-II' of FIG. 10.

FIG. 10 is a plan view showing the backlight assembly 206 of FIG. 9, and FIG. 11 is a sectional view taken along line II-II' of FIG. 10. Referring to FIGS. 10 and 11, the direct-type lamps 60 are arranged at predetermined intervals in the first and second directions D1 and D2. For example, the first, second and third direct-type lamps 61, 62, and 63 are sequentially arranged with a predetermined interval in the second direction D2, and the third and fourth direct-type lamps 63 and 64 are arranged with a predetermined interval in the first direction D1.

The light guide plate 106 is provided above the direct-type lamps 60, and has the light guide pattern 110. As described above with reference to FIG. 2, the light guide pattern 110 includes the first to third convex parts/protrusions 111, 112, and 113 having different sizes.

A portion of the light guide pattern 110 extends in the first direction D1 to cross the space between two adjacent direct-type lamps, for example, the space between the first and second direct-type lamps 61 and 62. In addition, another portion of the light guide pattern 110 extends in the second direction D2 to cross the space between the two adjacent direct-type lamps, for example, the space between the third and fourth direct-type lamps 63 and 64.

Similar to the light guide plate 100 (see FIG. 2), the light guide plate 106 has the light guide pattern 110 provided between two adjacent direct-type lamps. However, unlike the direct-type lamps 50 (see FIG. 2) having the foam of a line light source, since the direct-type lamps 60 are point light sources arranged in a matrix or lattice form on a plane, the light guide pattern 110 extends in the first and second directions D1 and D2 to surround the direct-type lamps 60.

Figure 12:
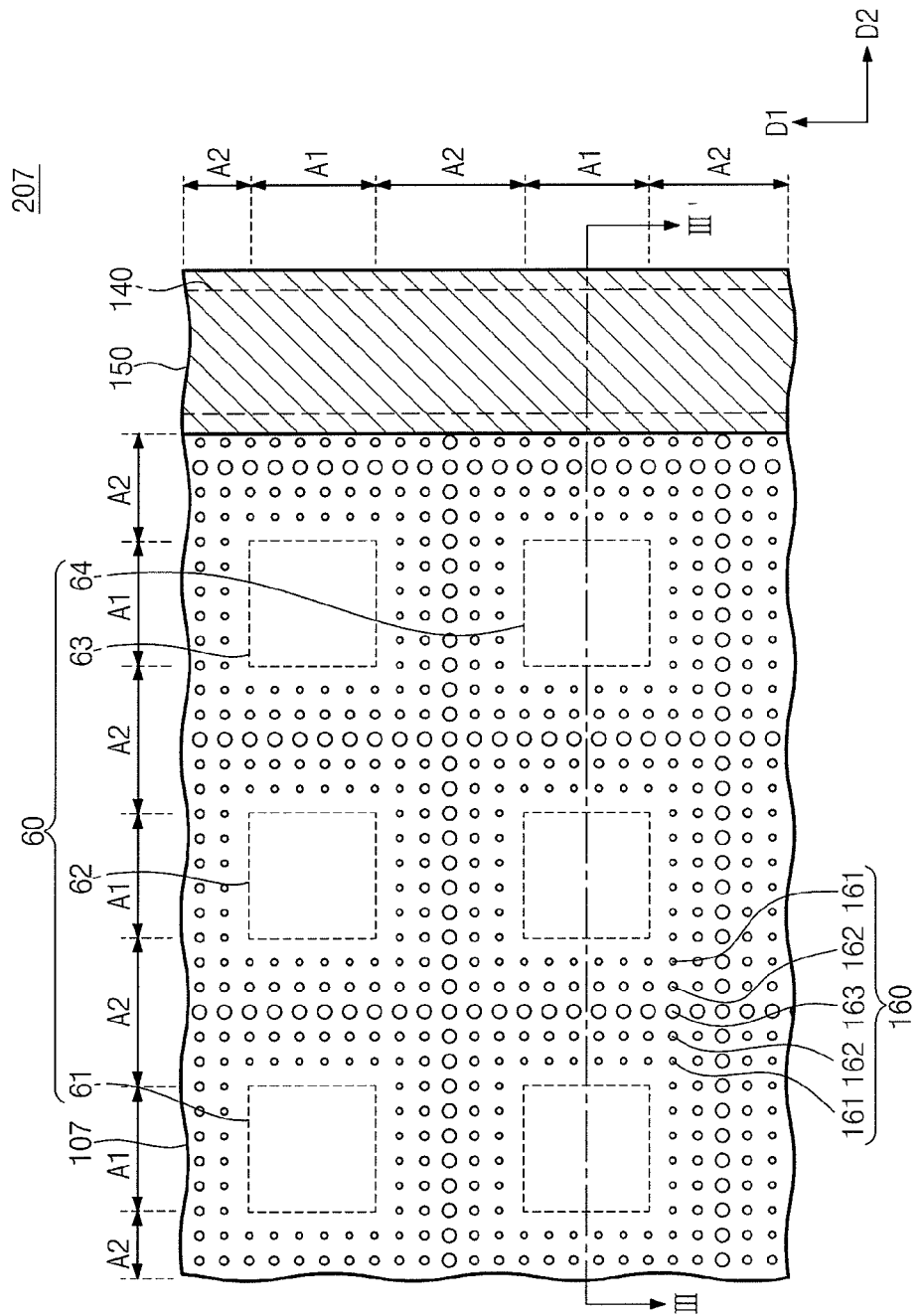
FIG. 12 is a plan view showing a backlight assembly according to an embodiment of the present invention.
Figure 13:
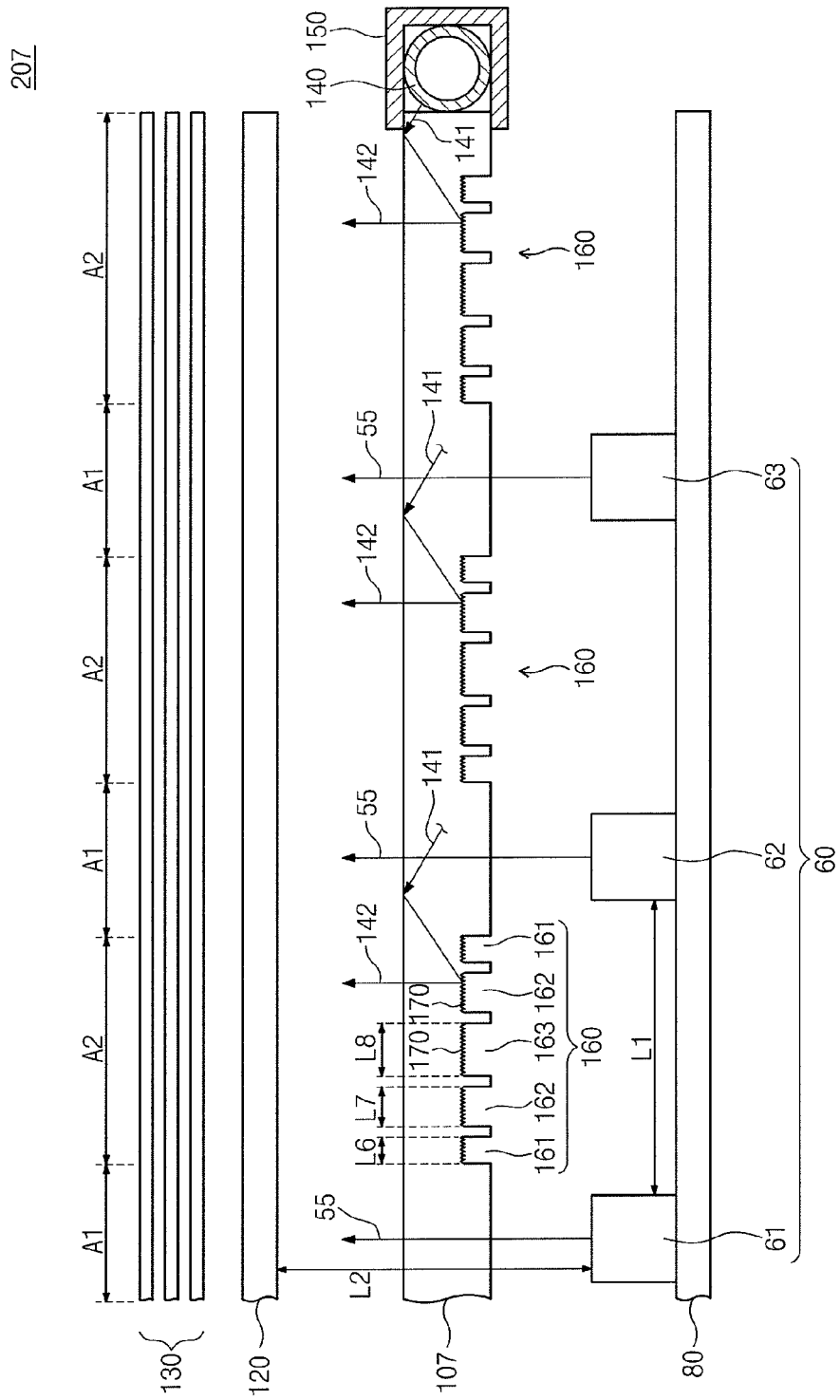
FIG. 13 is a sectional view taken along line III-III' of FIG. 12.

FIG. 12 is a plan view showing a backlight assembly 207 according to an embodiment of the present invention, and FIG. 13 is a sectional view taken along line III-III' of FIG. 12. Referring to FIGS. 12 and 13, a plurality of the direct-type lamps 60 having the form of point light sources are arranged at predetermined intervals in the first and second directions D1 and D2. For example, the first, second and third direct-type lamps 61, 62, and 63 are sequentially arranged with a predetermined interval in the second direction D2. The third and fourth direct-type lamps 63 and 64 are arranged with a predetermined interval in the first direction D1.

The light guide plate 107 is provided above the direct-type lamps 60, and the light guide plate 107 has the light guide pattern 160. As described with reference to FIG. 4, the light guide pattern 160 has the first concave parts 161, the second concave parts 162 having a greater width than the first concave parts 161, and the third concave parts 163 having a greater width than the second concave parts 162.

In addition, similar to the light guide plate 106, the light guide plate 107 has the light guide pattern 160 between two adjacent direct-type lamps 60. However, unlike the direct-type lamps 50 having the form of a line light source, since the direct-type lamps 60 are point light sources arranged in a matrix or lattice form on a plane, the light guide pattern 160 surrounds the direct-type lamps 60 on the plane.

Figure 14:
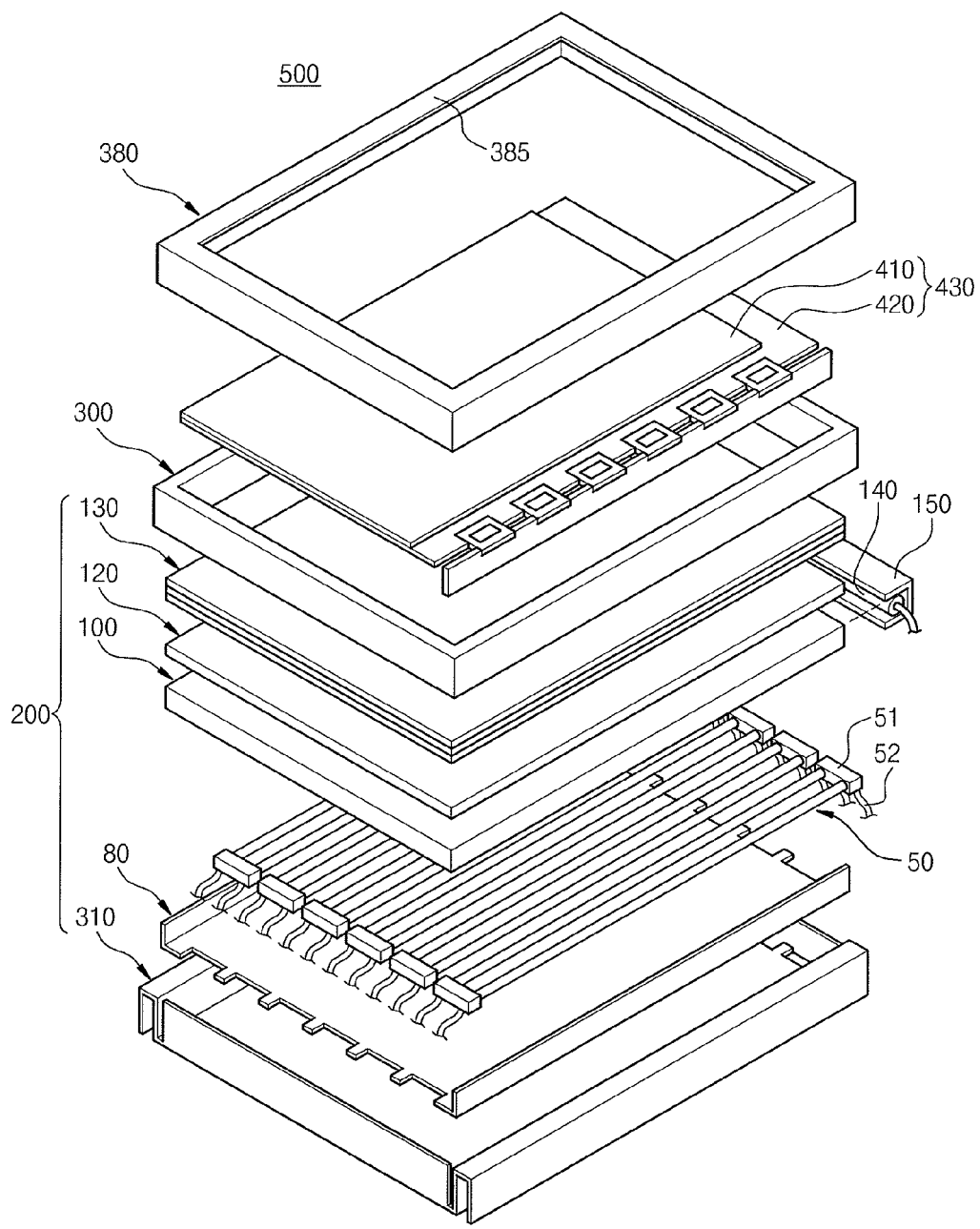
FIG. 14 is an exploded perspective view showing a liquid crystal display according to an embodiment of the present invention.

FIG. 14 is an exploded perspective view showing a liquid crystal display 500 according to an embodiment of the present invention. The liquid crystal display 500 includes the backlight assembly 200 (see FIG. 1). Referring to FIG. 14, the liquid crystal display 500 includes the backlight assembly 200 to emit light, a bottom chassis 310 having a receiving space, a top chassis 380 coupled with the bottom chassis 310, and a liquid crystal display panel 430 receiving light from the backlight assembly 200 to display an image.

In the liquid crystal display 500, the liquid crystal display panel 430 is provided above the backlight assembly 200 to receive light from the backlight assembly 200, thereby displaying an image. The liquid crystal display panel 430 includes a color filter substrate 410, a thin film transistor substrate 420, and a liquid crystal layer (not shown) interposed between the color filter substrate 410 and the thin film transistor substrate 420.

The thin film transistor substrate 420 includes pixels. The thin film transistor substrate 420 includes a plurality of thin film transistors (not shown) formed in a one-to-one relation with the pixels, and pixel electrodes (not shown) electrically connected to the thin film transistors in a one-to-one relation with the thin film transistors. The color filter substrate 410 includes one of a red color filter, a green color filter, and a blue color filter provided in a one-to-one relation with the pixels. The color filter substrate 410 includes a common electrode facing the pixel electrodes. A director of liquid crystal is changed by an electric field formed by the pixel electrodes and the common electrode, thereby adjusting an amount of light transmitted through the liquid crystal display panel 430.

The bottom chassis 310 includes a bottom part and sidewalls extending from the bottom part to provide the receiving space, and the backlight assembly 200 is received in the receiving space. The top chassis 380 is coupled with the bottom chassis 310 through the coupling with the sidewalls of the bottom chassis 310. The liquid crystal display 500 further includes a middle mold 300 interposed between the bottom chassis 310 and the top chassis 380, and the middle mold 300 stably fixes the liquid crystal display panel 430 into the liquid crystal display 500.

As described with reference to FIGS. 1, 2, 3A, 3B, and 3C, the liquid crystal display 500 can receive light having uniform brightness from the backlight assembly 200 throughout the whole light receiving region. Accordingly, image display quality of the liquid crystal display 500 can be improved.

In addition, the liquid crystal display 500 may include the backlight assemblies according to the other embodiments of the present invention in addition to the backlight assembly 200. For example, if the liquid crystal display 500 includes the backlight assembly 203 (see FIG. 6), the liquid crystal display 500 receives light having uniform brightness throughout the whole light receiving region, thereby improving image display quality. In addition, the volume of the liquid crystal display 500 can be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
    a first light source emitting a light;
    a light guide plate above the first light source and having a first region corresponding to a position of the first light source and a second region corresponding to a space between two adjacent first light sources;
    a second light source emitting a light and provided at a side portion of the light guide plate; and
    a light guide pattern positioned on the light guide plate at the second region to output the light emitted from the second light source to an exterior of the light guide plate, wherein the light guide pattern is not positioned at the first region of the light guide plate.

2. The backlight assembly of claim 1, wherein the light guide pattern comprises a plurality of convex parts, and each convex part comprises reflective surfaces formed at a lower surface of the light guide plate to reflect the light emitted from the second light source to an upper surface of the light guide plate.

3. The backlight assembly of claim 2, wherein a size of each convex part is reduced as each convex part is positioned closer to the first region.

4. The backlight assembly of claim 1, wherein the light guide pattern comprises concave-convex surfaces, and each concave-convex surface comprises reflective surfaces formed at a lower surface of the light guide plate to reflect the light emitted from the second light source to an upper surface of the light guide plate.

5. The backlight assembly of claim 4, wherein a size of each concave-convex surface is reduced as each concave-convex surface is positioned closer to the first region.

6. The backlight assembly of claim 1, wherein the light guide pattern comprises printed patterns on the light guide plate, wherein the printed patterns include reflective surfaces thereon, and the reflective surfaces are formed at a lower surface of the light guide plate to reflect the light emitted from the second light source to an upper surface of the light guide plate.

7. The backlight assembly of claim 6, wherein a size of each printed pattern is reduced as each printed pattern is positioned closer to the first region.

8. The backlight assembly of claim 2, further comprising a diffusion plate, wherein the light guide plate is interposed between the diffusion plate and the first light source to diffuse the light emitted from the first and second light sources.

9. The backlight assembly of claim 8, wherein when the number of the convex parts is a first value, a distance between the first light source and the diffusion plate is a first distance, and when the number of the convex parts is a second value larger than the first value, the distance between the first light source and the diffusion plate is a second distance smaller than the first distance.

10. The backlight assembly of claim 1, further comprising:
    a diffusion plate, wherein the light guide plate is interposed between the diffusion plate and the first light source to diffuse the light from the first and second light sources; and
    optical sheets, wherein the diffusion plate is interposed between the optical sheets and the light guide plate.

11. The backlight assembly of claim 1, further comprising:
    a diffusion plate, wherein the first light source is interposed between the diffusion plate and the light guide plate; and
    optical sheets, wherein the diffusion plate is interposed between the optical sheets and the first light source.

12. The backlight assembly of claim 1, further comprising:
    a diffusion plate interposed between the first light source and the light guide plate; and
    optical sheets, wherein the light guide plate is interposed between the diffusion plate and the optical sheets.

13. A liquid crystal display comprising:
    a liquid crystal display panel receiving a light to display an image; and
    a backlight assembly supplying the light to the liquid crystal display panel, wherein the backlight assembly comprises:
    a first light source emitting a portion of the light;
    a light guide plate provided above the first light source and having a first region corresponding to a position of the first light source and a second region corresponding to a space between two adjacent first light sources;
    a second light source emitting another portion of the light and provided at a side portion of the light guide plate; and
    a light guide pattern positioned on the light guide plate at the second region to output the light emitted from the second light source to an exterior of the light guide plate wherein the light guide pattern is not positioned at the first region of the light guide plate.

14. The liquid crystal display of claim 13, wherein the light guide pattern comprises a plurality of convex parts, and each convex part comprises reflective surfaces formed at a lower surface of the light guide plate to reflect the light emitted from the second light source to an upper surface of the light guide plate.

15. The liquid crystal display of claim 14, wherein a size of each convex part is reduced as each convex part is positioned closer to the first region.

16. The liquid crystal display of claim 13, wherein the light guide pattern comprises concave-convex patterns, and each concave-convex pattern comprises reflective surfaces formed at a lower surface of the light guide plate to reflect the light emitted from the second light source to an upper surface of the light guide plate.

17. The liquid crystal display of claim 13, wherein the light guide pattern comprises printed patterns on the light guide plate, the printed patterns having reflective surfaces thereon formed at a lower surface of the light guide plate to reflect the light emitted from the second light source to an upper surface of the light guide plate.

18. The liquid crystal display of claim 14, wherein the backlight assembly further comprises a diffusion plate interposed between the first light source and the liquid crystal panel, and wherein when the number of the convex parts is a first value, a distance between the first light source and the diffusion plate is a first distance, and when the number of the convex parts is a second value larger than the first value, the distance between the first light source and the diffusion plate is a second distance smaller than the first distance.

* * * * *